(12) United States Patent
Sato (10) Patent No.: US 7,455,712 B2
(45) Date of Patent: *Nov. 25, 2008

(54) FACE-CENTERED CUBIC STRUCTURE ALLOY PARTICLES AND METHOD OF MANUFACTURING SAME

(75) Inventor: Kimitaka Sato, Okayama (JP)

(73) Assignee: Dowa Electronics Materials Co., Ltd., Tokyo (JP)

( * ) Notice: Subject to any disclaimer, the term of this patent is extended or adjusted under 35 U.S.C. 154(b) by 283 days.

This patent is subject to a terminal disclaimer.

(21) Appl. No.: 11/202,085

(22) Filed: Aug. 12, 2005

(65) Prior Publication Data

US 2006/0032330 A1 Feb. 16, 2006

(30) Foreign Application Priority Data

Aug. 16, 2004 (JP) ............................ 2004-236752

(51) Int. Cl.
- C22C 19/07 (2006.01)
- B22F 1/00 (2006.01)
- B22F 9/16 (2006.01)
- B22F 9/24 (2006.01)

(52) U.S. Cl. ........................ 75/255; 75/371; 420/82; 977/773

(58) Field of Classification Search ............... 75/255, 75/371; 420/82
See application file for complete search history.

(56) References Cited

U.S. PATENT DOCUMENTS 6,262,129 B1* 7/2001 Murray et al. ............... 516/33
6,331,364 B1* 12/2001 Baglin et al. ................ 428/830
2002/0098383 A1* 7/2002 Maeda et al. ............ 428/694 T
2004/0074336 A1* 4/2004 Daimon et al. ............... 75/365
2004/0112472 A1* 6/2004 Pereira et al. ............... 148/300
2005/0051241 A1* 3/2005 Tohji ........................ 148/306

FOREIGN PATENT DOCUMENTS

JP 3258295 7/2001

OTHER PUBLICATIONS

S. Saita and S. Manosono, FePt nanoparticles with a narrow composition distribution synthesized via a pyrolysis of Iron (III) Ethoxide and Platinum (II) Acetylacetonate. Chem. Mater. 2005, 17, p. 3705-3710.*

K.E. Elkins et al. Ultrafine FePt nanoparticles prepaed by the chemical reduction method. Nano Letters vol. 3, No. 12, 2003, p. 1647-1649.*

(Continued)

Primary Examiner—Roy King
Assistant Examiner—Mark L Shevin
(74) Attorney, Agent, or Firm—Clark & Brody (57) ABSTRACT

Alloy particles of an alloy having a face-centered cubic structure comprise at least one selected from Fe and Co and at least one selected from Pt and Pd as principal components. The alloy particles have a TEM-measured average grain size $(D_{TEM})$ of not more than 50 nm, and a single crystallinity $(D_{TEM})/(D_X)$ that is less than 1.50, where $(D_X)$ is X-ray crystallite size. These alloy particles can be advantageously manufactured by using the polyol process to synthesize the alloy particles in the presence of a complexing agent.

10 Claims, 5 Drawing Sheets

OTHER PUBLICATIONS

A.C.C. Yu et al, Fabrication of monodispersive FePt nanoparticles films stabilized on rigid substrate, Applied Physics Letters, vol. 82 (24), Jun. 16, 2003, p. 4352-4354.*

Iwaka et al, Preparation of high coercivity magnetic FePt nanoparticles by liquid process, Journal of Applied Physics, vol. 94 (10), Nov. 15, 2003, p. 6807-6811.*

M. Nakaya et al, Novel synthesis of FePt nanoparticles and magnetic properties of their self-assembled superlattices, Chemistry Letters, vol. 33 (2) 2004, p. 130-131.*

B. Jeyadevan, et al. Direct synthesis of fct-FePt nanoparticles by chemical route, Jpn. J. Appl. Phys. vol. 42, (2003), p. 350-352.*

R. Harpeness and A. Gedanken, The microwave-assisted polyol synthesis of nanosized hard magnetic material, FePt, Journal of Materials Chemistry, vol. 15, (2005), p. 698-702.*

K. Sato et al, Oriented L10-FePt nanoparticles and their magnetic properties, Scripta. Mater. vol. 44, (2001), p. 1389-1393.*

K. Sato et al, Effect of additive element and particle size on the atomic ordering temperature of L10-FePt nanoparticles, Scripta. Mater. vol. 748, (2003), p. 921-927.*

R.J. Joseyphus et al, Composition controlled synthesis of fcc-FePt nanoparticles using a modified polyol process, J. Mater. Sci. vol. 43, (2007), p. 2402-2406.*

Y. Bao et al, A general approach to synthesis of nanoparticles with controlled morphologies and magnetic properties, J. Appl. Phys. vol. 97, (2005), p. 97.*

S. Sun, et al., "Monodisperse FePt Nanopartices and Ferromagnetic FePt Nanocrystal Superlattices", Science, vol. 287, Mar. 17, 2000, pp. 1989-1992.

B. Jeyadevan, et al., "Direct Synthesis of fct-FePt Nanoparticles by Chemical Route", Jpn. J. Appl. Phys., vol. 42 (2003), pp. L350-L352.

* cited by examiner

FACE-CENTERED CUBIC STRUCTURE ALLOY PARTICLES AND METHOD OF MANUFACTURING SAME

BACKGROUND OF THE INVENTION

1. Field of the Invention

The present invention relates to face-centered cubic (fcc) structure alloy particles, and to a method of manufacturing same, for obtaining ferromagnetic particles that can be used in high-density magnetic recording media, nanoscale electronics, permanent magnetic materials, biomolecular marker agents and drag delivery systems (DDS) and the like. More particularly, the present invention relates to non-magnetic fine particles of alloys of platinum group metals (Pt and Pd) and transition metals (Fe and Co) having an fcc structure. These are alloys which are difficult to obtain with the wet method, since it is difficult to simultaneously precipitate both metals from the ions of both metals. This fcc alloy can be heat-treated to phase-transform it to a face-centered tetragonal (fct) structure that exhibits ferromagnetism. That means that the alloy particles of this invention are a precursor for obtaining fct ferromagnetic alloy. As such, the alloy particles of this invention are also called ferromagnetic alloy particle precursors and the like. Also, with respect to the particles of alloy comprised of T and M components expressed by the general formula shown later herein, cited as a typical example is FePt alloy particles in which Fe is the T component and Pt is the M component. While in this specification, the alloy particles of this invention may also be referred to as FePt particles or FePt nanoparticles, these are just examples.

2. Description of the Prior Art

For high-density magnetic recording media to achieve higher recording densities, the size of the recording units has to be reduced. However, with media using a conventional spattered thin film of CoCr alloy, there is a limit on how much the recording density can be increased, due to various problems that include heat fluctuation, refinement or variation of crystal grain size, and so forth. Recently, this has caused attention to focus on FePt magnetic metal nanoparticles, which exhibit high anisotropy and high coercive force, and no heat fluctuation problem even when the crystal grain size is reduced to a size in the order of a single nanometer.

With respect to such magnetic metal nanoparticles, JP3258295B (corresponding to JP 2000-54012A) (Reference 1) and Science Vol. 287, 17 Mar. 2000, pp. 1989-1992 (Reference 2) describe methods of producing FePt alloy particles in a monodispersed state by thermally decomposing iron pentacarbonyl while simultaneously running a platinum (II) acetylacetonate reducing process using polyvalent alcohol.

The FePt particles obtained by these methods have an irregular-phase fcc crystal structure that causes nano-order particles to exhibit paramagnetism at ordinary temperatures. Therefore, to use them as ferromagnetic particles, the irregular phase structure has to undergo transition to a regular $L_{10}$ fct crystal structure through heat treatment.

This heat treatment has to be done at or above the transition temperature (Tt) at which the crystal undergoes transformation from an irregular to a regular phase structure, which generally is a high temperature of 500° C. or more. During this process, if the grain size distribution is broadened by the heat causing particles to coalesce together into assemblage, the particle structure becomes a mixture of single and multiple domains that is not suitable for high-density magnetic recording media applications. An effective way of preserving the grain size immediately following particle synthesis and obtaining ferromagnetic FePt particles, is to cover the particles with a protective agent that prevents adjacent particles from coalescing, or to use some method or other to reduce the transition temperature to enable the heat treatment to be carried out at a lower temperature.

The Japanese Journal of Applied Physics Vol. 42, No. 4A, 1 Apr. 2003, P. L 350-352 (Reference 3) describes synthesizing FePt particles by the polyol process by using tetraethylene glycol (TEG) as the polyol and reducing platinum and iron acetylacetonate at 300° C., thereby obtaining as-synthesized FePt nanoparticles having an fcc structure.

The Problems to be Solved in the Invention

The FePt particles obtained by the method of References 1 and 2 (also called the IBM method herein) immediately following the reaction have an fcc structure with no magnetism, in which state they cannot be used for high-density magnetic recording media applications. Thus, it is necessary to subject them to heat treatment at or above the fct crystal structure transition temperature for transformation to an fct structure that manifests ferromagnetism. The transition temperature in the case of the FePt particles obtained by the IBM method is in the order of 450° C., so heat treatment at or above 450° C. is required to effect the transition to the fct structure.

However, heating an aggregate of the FePt particles at or above a temperature of 450° C. causes the metal particles to coalesce together into assemblages. Even if an fct structure is achieved, the result is nanoparticles that are unsuited to high-density magnetic recording media applications. Generally, the particles do not coalesce evenly, giving rise to a distribution of grain sizes that produces a major spread in magnetic characteristics that in practice is a problem.

To prevent the particles from being agglomerated by the heat treatment, the particles first have to be spaced apart by a prescribed distance with, for example, each particle being fixed in position on a substrate, or some kind of barrier has to be provided that prevents the sintering of adjacent particles. However, achieving such heat treatment requires the use of precision technology for positioning the particles in a regular arrangement.

In addition, it is difficult to control the particle composition with the IBM method. For example, in a case in which the IBM method is used to fabricate FePt particles comprising 50 at % Fe and 50 at % Pt, for example, the fabrication is only made possible by at least doubling the mole amount of the Fe material. It is still not known what should be done to eliminated variation among particles. As a matter of fact, when the present inventor conducted experiments to corroborate the IBM method and used a TEM-EDS system to analyze the composition of the particles obtained, there was found to be major variations between particles. In the case of FePt alloy, the Pt content in the fct structure that manifests ferromagnetism resides in the range from 35 to 55 at %. Therefore, if there are particles with compositions outside that range, no amount of heat treatment will result in those particles undergoing a transition to an fct structure. Also, even if the Pt is from 35 to 55 at %, if that composition changes from particle to particle, the magnetic characteristics will also change, making the particles unsuitable for high-density magnetic recording media.

Reference 3 shows the possibility of obtaining FePt nanoparticles with an fct structure in the as-synthesized state. However, even when synthesized at 300° C. using TEG, the coercive force Hc of FePt nanoparticles obtained by the method described in the reference is no more than 370 oersted (Oe) at room temperature. When these particles were compared to those fabricated from TEG at 260° C., the possession of an fct structure is confirmed, but a room temperature coercive force Hc of 370 Oe makes them difficult to apply to practical magnetic recording.

An object of the present invention is therefore to resolve the above problem, in particular by improving the method of manufacturing FePt nanoparticles described in Reference 3 by obtaining fcc structure alloy particles (ferromagnetic alloy particle precursor) that makes it possible to obtain magnetic materials constituted by FePt nanoparticles having an fct structure with a small composition distribution that is a suitable material for practical magnetic recording applications.

It was ascertained that the above problem could be resolved by improving the single crystallinity of the fcc structure FePt particles. In the method of manufacturing FePt nanoparticles by the polyol process, in particular, it was found that when FePt particles are synthesized in the presence of a complexing agent, there was low compositional variation of the fcc structure FePt particles and the crystallinity was improved, effectively resolving the above problem.

SUMMARY OF THE INVENTION

To achieve the above object, the present invention provides alloy particles of an alloy with a face-centered cubic structure, comprising at least one selected from Fe and Co and at least one selected from Pt and Pd as principal components, the alloy particles having a TEM-measured average grain size ($D_{TEM}$) of not more than 50 nm, and a single crystallinity ($D_{TEM}$)/($D_X$) that is less than 1.50, where ($D_X$) is x-ray crystallite size.

The invention also achieves the above object by providing alloy particles of an alloy having a face-centered cubic structure, comprising T and M in which, when T is one or two selected from Fe and Co and M is one or two selected from Pt and Pd, X in formula $T_X M_{1-X}$ is a content composition ratio that is within the range 0.3 to 0.7, and, with respect to (T+M) not more than 30 atomic percent (including 0 percent) of metallic elements other than T and M, with the remainder being unavoidable impurities, the alloy particles having a TEM-measured average grain size ($D_{TEM}$) of not more than 50 nm, in which 90 or more out of 100 particles satisfy equations (1) below, and equation (2) below is satisfied.

$$0.90 X_{av} \leq X_1, X_2, \ldots X_{100} \leq 1.10 X_{av} \quad (1)$$

$$\text{Standard deviation } \sigma \text{ of } X_1, X_2, \ldots X_{100} \leq 20\% \quad (2)$$

in which, with respect to the value of X in the above $T_X M_{1-X}$, $X_{av}$ represents a measured particle value (value of X in the mean constituent of a particle assemblage), and $X_1, X_2, \ldots X_{100}$ represents the measured X value of each of 100 particles arbitrarily selected when the measurement field of view contains 1000 or more particles.

In a method of manufacturing alloy particles of an alloy comprises T and M in such a composition ratio that, when T is one or two selected from Fe and Co and M is one or two selected from Pt and Pd, X in formula $T_X M_{1-X}$ is within the range 0.3 to 0.7, and, with respect to (T+M) not more than 30 atomic percent (including 0 percent) of metallic elements other than T and M, with the remainder being unavoidable impurities, the alloy particles having a face-centered cubic structure according to the invention can be manufactured by a method comprising melting a metallic salt that contains the T component and M component to a state in which no solids remain in a solution constituted of polyvalent alcohol having a boiling point of 150° C. or above and/or derivatives thereof, using polyvalent alcohol and/or derivatives thereof to reduce the metallic salt with the solution at a temperature of 150° C. or above in an inert gas atmosphere, and progressing the reduction in the presence of a soluted complexing agent to synthesize particles of the alloy. The complexing agent can be at least one selected from the group acetylacetone, formic acid, citric acid, succinic acid, acetic acid, sulfamic acid, phthalic acid, malonic acid, malic acid and oxalic acid, used in an amount that in terms of mole ratio with respect to all metallic salts is an amount that is within a range of from 0.1 to 250.

Alloy particles having a better composition distribution can be obtained by progressing the reduction in the presence of a crystal nucleus induction agent. The crystal nucleus induction agent can be a salt of at least one metal selected from the group Au, Ag, Ru, Rh, Pd, Os, Ir and Pt, wherein when the metal is Pt or Pd, the salt used differs from the metallic salt of the material used for alloy synthesis. Also, as the metallic elements other than T and M that can contribute to reducing the transition temperature (Tt) at which the crystal undergoes transformation from an irregular to a regular phase structure, there can be used, for example, at least one selected from the group Au, Ag, Cu, Sb, Bi and Pb.

Further features of the invention, its nature and various advantages will be more apparent from the accompanying drawings and following detailed description of the invention.

DESCRIPTION OF THE PREFERRED EMBODIMENT

According to Reference 3, even when FePt particles are synthesized by the polyol process using tetraethylene glycol (TEG) as the polyol and reducing platinum and iron acetylacetonate at 260° C., x-ray diffraction showed no peaks arising from an fct structure, and the coercive force at room temperature was no more than 10 Oe. However, when the same materials were used and the reduction was carried out at 300° C., x-ray diffraction showed a peak arising from an fct structure and a coercive force of 370 Oe. This can be considered to be due to the fact that changing the reduction temperature from 260° C. to 300° C. brought about a phase transformation from an fcc to an fct structure. In this way, it was established that the method of Reference 3 made it possible to directly obtain FePt alloy particles having an fct structure that manifests coercive force, without the vapor-phase heat treatment of References 1 and 2. However, at 370 Oe, the coercive force was much smaller than that reported by References 1 and 2.

The present inventor conducted numerous studies on the method of synthesizing FePt particles by the polyol process, as typified in Reference 3. As a result, it was found that producing FePt particles having an fcc structure with high single crystallinity and low variation in particle composition was key to obtaining FePt particles having good magnetic characteristics, in particular a high coercive force. It was also discovered that this could be achieved by implementing the polyol process in the presence of a complexing agent.

Specific items or features of the invention will now be individually described.

Alloy Composition

The alloy particles having an fcc structure of this invention are constituted of an alloy that contains at least Fe and/or Co, and Pt and/or Pd. The alloy comprises T and M in such a composition ratio that, when T is one or two selected from Fe and Co and M is one or two selected from Pt and Pd, X in formula $T_X M_{1-X}$ is within the range 0.3 to 0.7, with the remainder being unavoidable impurities. Metallic elements other than T and M account for not more than 30 at % (including 0 percent) with respect to (T+M).

In the case of this alloy, a composition in which X=0.5 is ideal for forming an fct structure from an fcc structure. However, a metal having a structure that is from 10 to 100% fct can be obtained with an X in the range 0.3 to 0.7. For the alloy of this invention, metallic elements other than T and M include metallic elements that can have an effect on the phase transformation (Z components), and metallic elements included in crystal nucleus induction agents (Z components). The alloy can contain a total amount of the Z and N components that, with respect to (T+M), is not more than 30 at % (including 0 percent). Depending on the case, the amount may be not more than 20 at %, or not more than 10 at %, or in some cases, it may be 0 at %.

In the case of the Z component, to have an effect on the phase transformation means having the effect of lowering the crystal structure transition temperature (Tt) at which the structure changes from fcc to fct during FePt particle synthesis by the polyol process. Specifically, when a Z salt is added and the metal is reduced, the Z metal is segregated to the crystallite boundary or grain boundary, exhibiting the above effect. Metallic elements that have that effect include Au, Ag, Cu, Sb, Bi and Pb. With respect to the Z component, it is important that the salt thereof be reduced by a polyol. The Z component content amount should be less than 30 at % of the total amount of T plus M. It is undesirable for Z/(T+M) to be 30 at % or more, since that will mean there is too much Z component, hindering the manifestation of the fct structure and therefore causing a rapid degeneration of the magnetic characteristics. The Z component is not essential. When an fct structure can be obtained without adding a Z component, the alloy does not have to contain the Z component.

The N component is a residual metallic element other than T, M and Z, deriving from the crystal nucleus induction agent used during the manufacture of the alloy. The N component content amount should be less than 20 at % of the total amount of T plus M. It is undesirable for N/(T+M) to be 20 at % or more, since that will mean there is too much N component, hindering the manifestation of the fct structure and therefore causing a rapid degeneration of the magnetic characteristics. The crystal nucleus induction agent used during the manufacture of the alloy may be a salt of a metal that is the same as the metallic elements of T, M and Z. In such a case the N component will be the same as one of the T, M and Z components, meaning that the alloy composition will not include an N component other than the T, M or Z. However, when the metal component N of the crystal nucleus induction agent is the same as a metallic element of T, M or Z, the metallic salt of N is used as a different kind of salt from the salt of T, M or Z.

With respect to the unavoidable inclusion of impurities during the alloy manufacturing process, the alloy may include such impurities to the extent that such inclusion does not have a significant effect on the characteristics. The permissible content amount of such impurities is not more than 5 wt %, preferably not more than 2 wt %, and more preferably not more than 1 wt %.

A feature of this invention is that, even though the alloy particles are extremely small, the alloy composition of the particles is very uniform. The specific features of the invention are described below. For simplicity, the explanation is given with respect to an example of FePt particles in which T is Fe and M is Pt. However, FePt particles are no more than an example; the same effect is obtained using an alloy in which Co is used instead of Fe, or Pd instead of Co.

A TEM-EDX (also called TEM-EDS) system can be used to analyze the composition of the individual FePt particles. An electron beam nanoprobe of a TEM (transmission electron microscope) was used to focus on a measurement area of 1 to 2 nm for analysis by energy-dispersive x-ray spectroscopy (EDX). With the FePt nanoparticles to be measured spread out away from each other, this made it possible to analyze the composition of the individual particles. TEM-EDX measurement equipment include the HF-2000 TEM with a 200 kV acceleration voltage manufactured by Hitachi, Ltd., and the Vantage system manufactured by Noran Instruments Inc. In this specification, the TEM-EDS terms employed previously are used as being included in the TEM-EDX terminology.

The average composition of the alloy particles of the invention was obtained by dissolving the particles in acid and using ICP measurement. With the TEM-EDX measurement, the composition of each of the 1000 or more particles in the field of view can be individually measured and the obtained values averaged also to obtain an average composition.

In accordance with this invention, FePt nanoparticles are provided between the average particle composition and the compositions of each of the individual particles that substantially satisfy the relationships of equations (1) and (2).

$$0.90 X_{av} \leq X_1, X_2, \ldots X_{100} \leq 1.10 X_{av} \quad (1)$$

$$\text{Standard deviation } \sigma \text{ of } X_1, X_2, \ldots X_{100} \leq 20\% \quad (2)$$

in which, with respect to the value of X in the above $T_X M_{1-X}$, $X_{av}$ is a measured particle value (value of X in the mean constituent of a particle assemblage), and $X_1, X_2, \ldots X_{100}$ represents the measured X value of each of 100 particles arbitrarily selected when the measurement field of view contains 1000 or more particles. Substantially satisfies equation (1) means that the X component of each of the hundred particles is within ±10% of the average value of an assemblage's (powder's) X component. However, it is permissible for the particles to be used for magnetic recording applications and the like even if not more than 10 out of 100 particles, and more preferably not more than 5 out of 100 particles, do not meet that condition. This is defined as 90 or more out of 100 particles satisfying equation (1). Satisfying equation (2) means that standard deviation σ representing the range of variation in the individual X component values of the 100 particles is within 20%.

Figure 1:
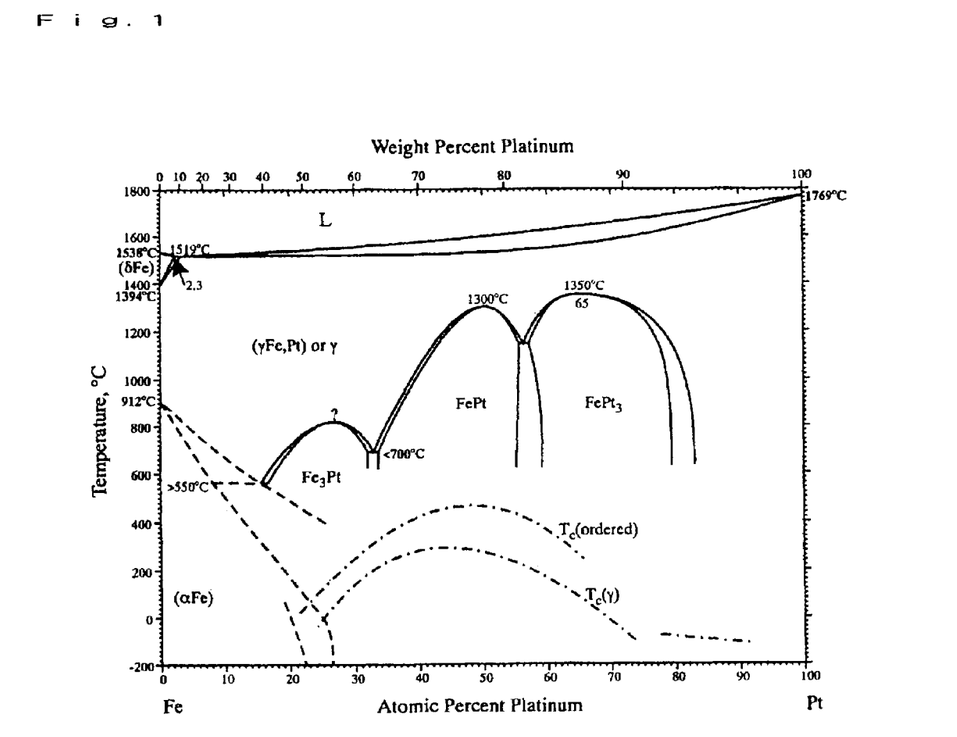
FIG. 1 is a diagram of the equilibrium state of a two-element (Fe—Pt) system.

FIG. 1 is a diagram of the equilibrium state of a two-element (Fe—Pt) system. As can be seen in FIG. 1, when the composition differs, the temperature of the transition from the fcc to the fct structure changes. Consequently, if the particles all have different compositions, even if they are heat treated at the same temperature, some particles will undergo a phase transformation to an fct structure and some will not (or will undergo only a partial phase transformation), resulting in magnetic characteristics that differ from particle to particle. In the worst case, even when the average particle composition contains 35 to 55 at % Pt (the range in the FePt of FIG. 1), in certain particles the Pt content amount may be outside that range. In that case, the particle will not undergo a phase transformation to an fct structure, no matter how much heat is applied. This is a fatal problem in the context of magnetic recording applications, since this kind of variation from particle to particle will lead to write errors and data loss.

As the magnetic recording densities of recent hard disks has increased, the dimensions of recording bits, including in the track direction, have become extremely small. The dimensions have been downsized to the extent that they are nearing the dimensions of the crystal grains that constitute today's thin-film magnetic recording media. For example, at a recording density of 10 Gbit/in$^2$, a recording bit takes up an area of 0.063 $\mu m^2$; at 50 Gbit/in$^2$, it takes up 0.013 $\mu m^2$; and at 100 Gbit/in$^2$, it takes up 0.0063 $\mu m^2$. Assuming a magnetic coating has an average crystal grain size of 15 nm, the number of crystal grains included in one bit is 278, 56 and 28, respectively. (see Handbook of Recording and Memory Materials, edited by T. Osaka, Y. Yamazaki and H. Ishihara). Thus, the higher the magnetic recording density becomes, the more important uniformity of particle characteristics becomes. At 100 Gbit/in$^2$, for example, if one of 28 magnetic particles is non-magnetic, the signal output by that recording bit will be 3.6% smaller. If three of the 28 particles are non-magnetic, the output will decrease by 10.7%. Such variation in output is undesirable in the context of high-density magnetic recording media, since it increases the data error rate and gives rise to write errors and loss of data.

In the case of FePt particles, an fct structure that exhibits ferromagnetism is only achieved when the ratio of Fe is 45 to 65 at % (i.e., 35 to 55 at % in the case of Pt). Therefore, to achieve uniformity of particle characteristics, first, the composition of each particle has to be uniform within that range. However, even if the composition is within the range in which an fct structure is manifested, in practice the proportion of fct structure in the individual particle may differ, giving rise to variation in the magnetic characteristics of the particles. Even if all of the particles do have a single-phase fct structure, differences in the content proportions of the Fe and Pt, that is, compositional differences, will result in differences in the magnetic characteristics, such as the crystal magnetic anisotropy constant and magnetic saturation.

In the end, whatever case is assumed, compositional variation of the individual particles is related to variation in the individual magnetic properties. As such, compositional uniformity of the individual particles can be considered an essential condition for high-density magnetic recording media applications. However, in the case of FePt nanoparticles, it is not easy to obtain alloy particles having a uniform composition. This is because there is a large difference in the standard electrode potential of Pt ions and Fe ions, so when a reducing agent is used for wet method reduction to precipitate the FePt alloy, Pt ions, being more readily reducible, are reduced first.

When synthesizing the alloy of the FePt nanoparticles by the polyol process in accordance with this invention, it was ascertained that by carrying out the reduction in the presence of a complexing agent, it was possible to form FePt particles having a single crystallinity and, by extension, it was possible to synthesize FePt particles with a low degree of variation in the composition of the individual particles. It was also ascertained that it was desirable to use a crystal nucleus induction agent to control the reduction reaction, since doing so resulted in a further decrease in the degree of variation in the composition of the particles. In accordance with this, the inventor succeeded in stably obtaining FePt nanoparticles that substantially satisfied equation (1) and satisfied equation (2).

Face-Centered Cubic (fcc) Structure

The FePt particles of this invention have an fcc structure. Therefore, x-ray diffraction shows peaks produced by an fcc structure. Although some parts may have an fct structure, the proportion of such parts is 10% or less. Therefore, in order to obtain magnetic material with an fct structure, the fcc-structure FePt particles are phase-transformed to an fct structure. This phase transformation can be done by heat-treating the fcc-structure FePt particles in a vapor phase. However, after the FePt particles having an fcc structure according to this invention have been manufactured by the polyol process, they can be phase-transformed to an fct structure by, for example, maintaining them at a higher temperature in the post-reaction solution, or by maintaining them at a higher temperature in another solution.

With respect to the target FePt alloy of this invention, the x-ray diffraction patterns of fcc and fct alloy structures are almost the same, in addition to which the (001) and (110) reflections that are obtained only in the case of an fct structure have a very low intensity, making it difficult to quantify an fct structure based solely on the peaks thereof. The proportion of the FePt alloy accounted for by fct structure can be calculated by subjecting the alloy to Moessbauer spectrometry measurements and analyzing what proportion of the alloy has a ferromagnetic structure. That is, Moessbauer spectrometry measurements can be used to obtain the numerical proportion of Fe atoms under the magnetic order, and that can be used as the proportion of fct structure.

Particle Grain Size

The FePt particles according to this invention have an average TEM-measured primary particle grain size that is not more than 50 nm, preferably not more than 30 nm, and more preferably not more than 20 nm. Primary particle refers to the smallest unit into which a particle can be divided. When the FePt alloy particles are to be used for magnetic recording media applications, the particle grain size is closely related to the recording density; generally, the smaller the grain size, the higher the recording density. The particles according to this invention have an average TEM-measured primary particle grain size of not more than 50 nm, preferably not more than 30 nm, and more preferably not more than 20 nm, and therefore are suitable for magnetic recording media applications.

X-ray crystallite size ($D_X$)

A Scherrer formula can be used to find the crystal grain size of the FePt particles of the invention from x-ray diffraction results. This being the case, in this specification, crystal grain size is referred to as x-ray crystallite size ($D_X$). This is obtained as follows.

The Scherrer formula is represented by the following general formula.

$$D = K \cdot \lambda / \beta \, Cos\theta$$

In the formula, K is Scherrer constant; D is crystallite size; $\lambda$ is measurement x-ray wavelength; $\beta$ is half width of peak obtained by x-ray diffraction; and $\theta$ is Bragg angle of diffraction beam. In the following embodiments, a value of 0.94 is used for K, and a copper x-ray tube is used. These are substituted into the above formula, so that:

$$D = 0.94 \times 1.5405 / \beta \, Cos\theta$$

(111) plane in which FePt system alloy particle peaks can be observed in the vicinity of 41° can be used to obtain D using this formula. With respect to alloy particles of other component systems, a peak that is large enough to be separated from adjacent peaks can be used.

A feature of the FePt particles according to this invention is the low number of crystal grains in one particle. Due to this, there is a constant relationship (single crystallinity<1.50) between the X-ray crystallite size ($D_X$) and the average TEM-measured primary particle grain size ($D_{TEM}$), but looking just at the X-ray crystallite size ($D_x$), $D_x$ generally is 4.0 nm or more, preferably 5.0 nm or more, and more preferably 6.0 nm or more.

Single Crystallinity

The ratio ($D_{TEM}$)/($D_X$) of the FePt particles of the invention is less than 1.50. This ratio ($D_{TEM}$)/($D_X$) is called the single crystallinity in the specification. A smaller ratio signifies that there are fewer crystal grains in one particle. Conversely; with a larger single crystallinity, the primary particle is a polycrystal comprised of many crystal grains. However, even when an fcc-structure primary particle comprised of many crystal grains is subjected to heat treatment that effects a phase transformation to an fct structure, it becomes a polycrystal. When FePt particles for magnetic applications are in a polycrystalline state, a mutual cancellation of the crystal magnetic anisotropy of the crystal grains in the primary particles takes place. So, it can be assumed that in such a case, the result will be a major decrease in particle magnetic anisotropy, compared to that of a single-crystal particle of the same volume.

Even if a primary particle having an fcc structure is a polycrystalline particle, it is possible to try to effect single crystallization thereof when subjecting it to heat treatment to effect phase transformation, by raising the temperature used for the heat treatment. However, raising the temperature to a high enough level for that purpose also causes sintering between particles, coarsening the particles, leading to the use of a multi-domain structure to stabilize the magnetization, so that ultimately, the magnetic anisotropy is weakened. Moreover, the increase their physical size due to the coarsening makes the particles unsuitable for the high recording density flux reversals required for high-density magnetic recording. Thus, it is undesirable for primary particles having an fcc structure to be a polycrystalline particle; instead, primary particles should have a low single crystallinity.

In accordance with this invention, fcc-structure FePt particles are achieved in which the single crystallinity (i.e. ($D_{TEM}$)/($D_X$)) is less than 1.50. If a primary particle is a single crystal, logically, the single crystallinity will be 1. At first glance, it might seem impossible to make the single crystallinity smaller than 1, but in fact, that is not the case. Since actual particles have a particle distribution, and the average grain size is the average value of the individual particles, it is generally easy to shift the values to the fine particle side. Conversely, it is easy to shift the x-ray crystallite size ($D_X$) towards the large grain sizes. Therefore, when taking the ratio between the measured (DTEM) and ($D_X$), in practice, it can be smaller than 1. However, from the experience of the inventor, if this ratio is smaller than 0.6, that is, if the single crystallinity is less than 0.6, the grain size distribution becomes too broad, making the particles unsuitable for magnetic recording media applications. Therefore, in the case of the fcc-structure FePt particles of this invention, the single crystallinity is within the range 0.6 to less than 1.50, thereby ensuring a crystalline form that is suitable for obtaining FePt particles with an fct structure having excellent magnetic characteristics. A single crystallinity that is less than 1.5 corresponds to there being up to five crystal grains in a primary particle.

Manufacturing Method

In Reference 3, FePt particles having an fct structure were obtained that exhibited a coercive force of 370 Oe. When the fcc structure precursor of this invention is subjected to heat treatment to effect phase transformation to an fct structure, it is possible to synthesize fct-structure FePt particles having a higher coercive force. The method of manufacturing the fcc-structure FePt particles according to the invention is characterized by the reduction of the T and M components of the formula $T_XM_{1-X}$ by the polyol process being progressed in the presence of a complexing agent. Specifically, the method comprises melting a metallic salt that contains the T component and M component in a content composition ratio wherein said X is within the range 0.3 to 0.7 to a state in which no solids remain in a solution constituted of polyvalent alcohol having a boiling point of 150° C. or above and/or derivatives thereof, and using polyvalent alcohol and/or derivatives thereof to reduce the metallic salt with the solution at a temperature of 150° C. or above in an inert gas atmosphere, using the reduction to synthesize the particles of the alloy, progressing the reduction in a complexing agent solution, and in some cases, also initiating the reduction in the presence of a crystal nucleus induction agent.

The complexing agent can be at least one selected from the group acetylacetone, formic acid, citric acid, succinic acid, acetic acid, sulfamic acid, phthalic acid, malonic acid, malic acid and oxalic acid, or, depending on the case, salts of these (including ammonium salt). That is, basically, as the complexing agent, there may be used any substance that can effect complexing of the constituent metallic ions in solution in the polyol. The agent may be used in an amount that in terms of mole ratio with respect to all metallic salts is an amount that is within the range 0.1 to 250. If the mole ratio is less than 0.1, it will not be sufficiently effective with respect to homogenizing the composition of the particles and raising the single crystallinity. On the other hand, if the mole ratio is more than 250 times higher, the effect is saturated, it is not economical, and the reaction becomes too slow, reducing productivity.

Thus, the composition of the fcc-structure FePt particles can be homogenized and the single crystallinity raised by adding a complexing agent. Why this is so is not altogether clear, but it is thought to be due to the fact that it enables the alloy synthesis reaction speed to be controlled. When the complexing agent is added, the T and M components form complexes in the polyol, so these components exist as complex ions in the solution. As a result, the solubility of the solution is increased. In addition, low-temperature metallization of the readily-reducible M components is suppressed. It is the overall contribution of these factors that can be considered as making it possible to homogenize the composition of the FePt alloy particles and raise the single crystallinity thereof.

Moreover, progressing the reduction reaction in the presence of a crystal nucleus induction agent helps to further increase the compositional uniformity in particles each other. The crystal nucleus induction agent can be a salt of at least one metal (called the N component) selected from the group Au, Ag, Ru, Rh, Pd, Os, Ir and Pt. When the metal is Pt or Pd, the salt used differs from the metallic salt of the material used for synthesizing the alloy. When N is different from T or M, the amount of the crystal nucleus induction agent used should be in the range of 0.01 to 20 at % of N/(T+M). When N is the same as T or M, it is used in an amount whereby X in $T_XM_{1-X}$ falls within the range of not less than 0.3 and not more than 0.7, or not less than 0.01 at % and not more than 20 at % with respect to T+M in the alloy material. If the crystal nucleus induction agent is used in an amount that is less than 0.01 at %, it will not reduce particle composition variation or improve reaction reproducibility. On the other hand, it is undesirable to use it in an amount that exceeds 20 at %, since that will increase the adverse effects, such as impeding the crystal growth.

The polyol process is implemented by dissolving metallic salts that contain T and M components in the polyol, using the polyol (polyvalent alcohol) to reduce the T and M component ions into the metals under refluxing the condensed solution formed in a reflux condense into the reaction solution, thereby obtain $T_XM_{1-X}$ alloy particles (in which X is from 0.3 to 0.7). For the polyvalent alcohol, it is preferable to use ethylene glycol, tri-ethylene glycol or tetraethylene glycol. However, the polyvalent alcohol is not limited to these; instead, any polyvalent alcohol or derivative thereof having a boiling point of at least 150° C. may be used. It is also possible to use just one such polyvalent alcohol or derivative, or a mixture of two or more.

The metal materials that are dissolved in the polyvalent alcohol are preferably metallic complexes, and more preferably acetylacetonate. In the case of FePt particles, the Fe and Pt can be provided by using iron (III) acetylacetonate and platinum (II) acetylacetonate. In practice, after the iron (III) acetylacetonate and platinum (II) acetylacetonate are completely dissolved in the polyvalent alcohol, the solution is, heated to 150° C. or more, and preferably to 270° C. or more and refluxed with returning the condensed solution from the vapor into the reaction solution in an inert gas atmosphere to progress the reduction reaction. It is undesirable for the metallic salts not to be completely dissolved prior to elevating the temperature, since the presence of undissolved solids gives rise to variations in compositions inside and outside the synthesized particles, and in the metallic structures.

It is important to effect appropriate control of the speed of the synthesis reaction. To do this, it is also important to adjust the metal concentration in the solution. Specifically, the super saturation degree of the produced metal can be reduced and nuclei generation and particle growth speed can be decreased by holding down the metal concentration. The mole ratio of all of the metallic ions contained in the polyol and metallic salts, that is, the polyol/all metallic ions mole ratio should, for example, be 100 or more. The temperature elevation rate should be set at 1° C./minute or more. Strictly speaking, the temperature elevation rate refers to the average temperature elevation rate from 50° C. to 150° C.

When it is desired to include the Z component that has the effect of reducing the fcc to fct structure transition temperature (Tt) in the alloy, this can be done by dissolving the salt of a Z component that can be reduced by the polyol in the solution that implements the polyol process. The Z salt will be reduced by the polyol and the metallic component segregated to the grain boundaries of the $T_XM_{1-X}$ alloy, lowering the transition temperature.

A dispersant can be included in the synthesis reaction solution. The dispersant is adsorbed on the surface of the particles, thereby suppressing agglutination of particles. The grain size of the synthesized FePt particles can also be controlled by use of an appropriate dispersant type and addition amount. Dispersants that can be used include surface active agents having amine, amide and azo radicals with N atoms that are readily adsorbed on the surface of the FePt particles, and organic molecules in the structure that include thiole or carboxyl radicals.

In this way, it is possible to obtain fcc-structure FePt alloy particles having low compositional variation and a high single crystallinity, which can be phase-transformed to an fct structure by carrying out heat treatment at an appropriate temperature. When vapor-phase heat treatment is used, particles can be prevented from sintering together by adhering a coupling agent or the like to the surface of the particles.

When liquid-phase heat treatment is used, it can be done, following the completion of the synthesis reaction by the polyol process, by a process comprising transferring the substances contained in the obtained alloy particles to polyvalent alcohol or derivatives thereof having a boiling point of 200° C. or more, preferably 270° C. or more, and maintaining that state at a reaction temperature of 200° C., preferably 270° C. or more, for at least one hour, preferably for at least 3 hours, and more preferably for at least 5 hours. When the polyvalent alcohol or derivatives thereof used for the heat treatment having a boiling point of 200° C. or more, preferably 270° C. or more, is used in the synthesis reaction from the start, after the step of manufacturing the alloy particles having an fcc structure has been completed, the temperature can be raised to carry out the heat treatment to effect the phase transformation to an fct structure.

The invention will now be further described, with reference to examples.

EXAMPLE 1

1.30 mmol/L of iron (III) acetylacetonate and 1.30 mmol/L of platinum (III) acetylacetonate were added to 200 mL of tetraethylene glycol (boiling point: 327° C.) and dissolved until there no solid portions of the iron (III) acetylacetonate and platinum (III) acetylacetonate remained. Then, 25.978 mmol (a mol amount that is 50 times the mol amount of the iron and platinum total) of succinic acid was added and dissolved until no solid portions remained.

The solution was transferred to a container having a circulator with a reflux condenser and placed on an oil bath, and an inert gas consisting of nitrogen gas was blown into the container at a flow rate of 400 mL/min while the solution was agitated at rotation speed of 160 rpm while being heated. It was refluxed for one hour at 200° C., and the reaction terminated. For the heating, the temperature was elevated at a rate of 10° C./min (the average temperature elevation rate from 50° C. to 150° C.).

After the termination of the reaction, an amount of ethanol was added that was equivalent to three times the amount of the solution, and the solution was centrifuged, the supernatant liquid was removed, and 100 mL of methanol was added to the residue (the particles), which was then placed in an ultrasonic cleaning tank, where the particles were dispersed. The dispersion solution was then centrifuged and the supernatant removed. Methanal was again added to the residue (particles) which was again dispersed in an ultrasonic cleaning tank and centrifuged for cleaning purposes, and this procedure was repeated a further two times. After the supernatant had been removed for the last time, the FePt nanoparticles thus obtained was provided to measure in the transmission electron microscopy (TEM) and x-ray diffraction (XRD), and to analyze the composition and magnetic properties by VSM. In the TEM-based measurements, the FePt particles were placed in hexane, oleic acid and oleylamine were added as surface active agents and the particles subjected to ultrasonic dispersion to obtain a dispersion solution to the observation.

Figure 2:
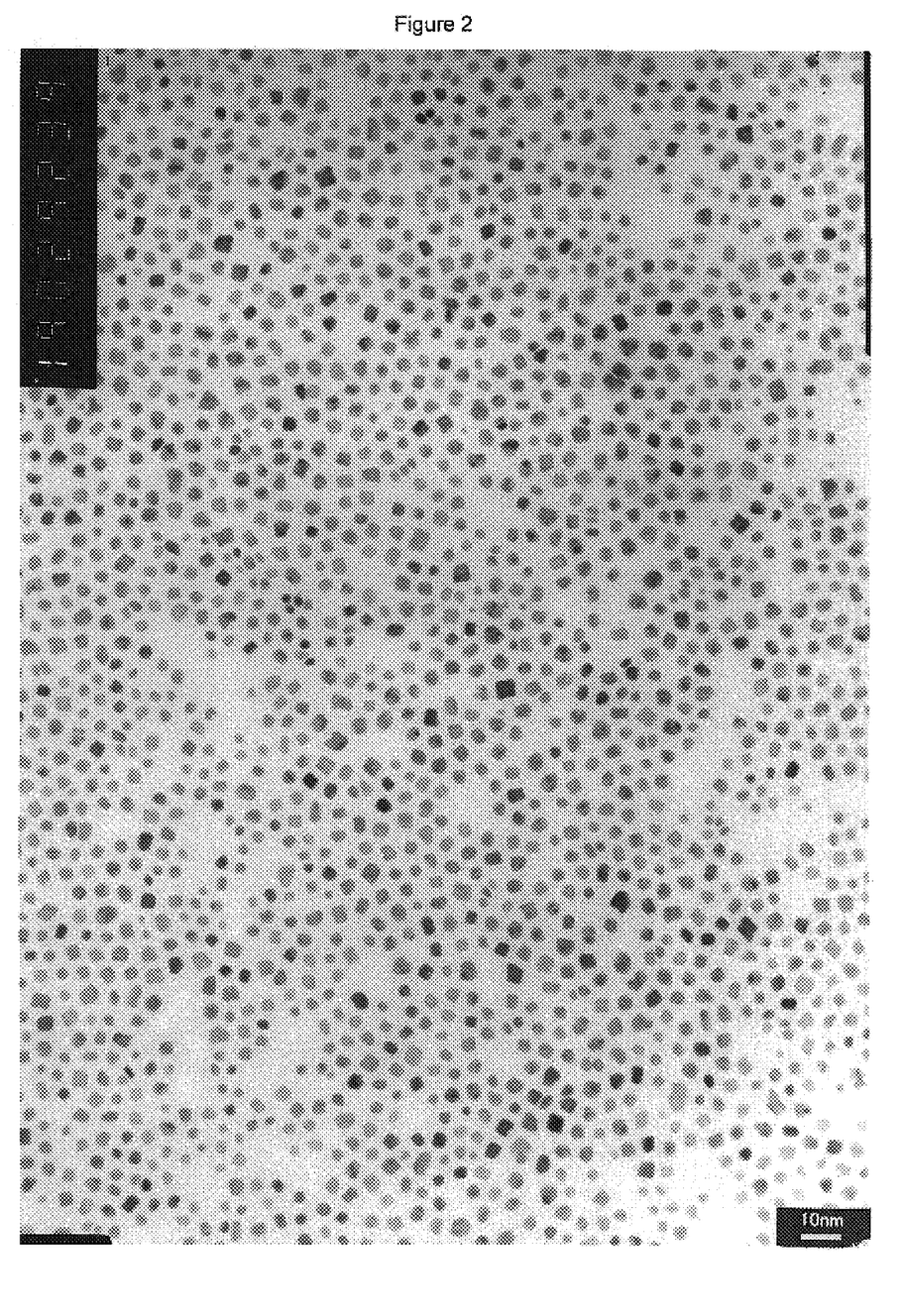
FIG. 2 is a TEM photomicrograph of the FePt alloy particles according to the present invention.

FIG. 2 shows the result of the TEM measurement. The average grain size of the primary particles was 5.9 nm, and the particles were seen to have good, sharp crystallinity. The x-ray diffraction showed no diffraction peaks corresponding to (001) and (110) superlattice reflections from an fct structure, only peaks from fcc structures. The x-ray crystallite size ($D_X$) was 5.4 nm. Based on this, the single crystallinity was 1.09.

The TEM-EDS measurements showed that, in terms of atomic ratio, the average composition measured with respect to more than 1000 particles in the measurement field of view was Fe:Pt=52:48. That is, $X_{av}$ was 52.0 at %. Also, the composition of 100 particles randomly selected from the view was analyzed. With a standard deviation σ of 12%, 97 particles satisfied the following equation (1), and only three particles failed to do so.

$$0.90X_{av} \leq X_1, X_2, \ldots X_{100} \leq 1.10X_{av} \quad (1)$$

Measurements of magnetic properties showed a coercive force of 46 Oe, a magnetic saturation amount σs of 0.4 emu/g, and an SQ of 0.04. SFD was unmeasurable.

EXAMPLE 2

Except for the use of 129.89 mmol (250 times the mol amount of the iron and platinum total) of acetic acid instead of succinic acid as the complexing agent, the procedure used for Example 1 was repeated.

Figure 3:
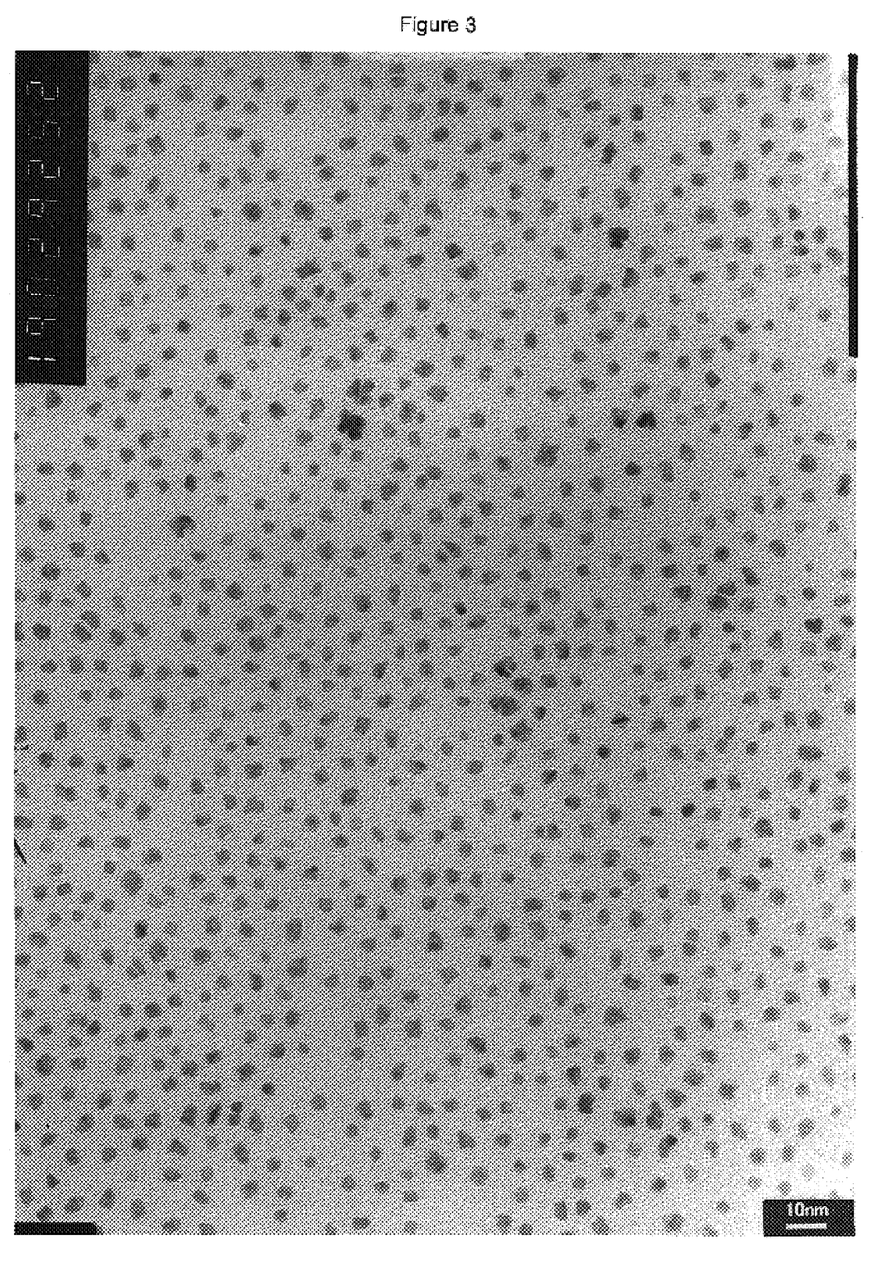
FIG. 3 is a TEM photomicrograph of another example of the FePt alloy particles according to the present invention.

The TEM-based measurement result is shown in FIG. 3. The average grain size of the primary particles was 5.7 nm, and the particles were seen to have good, sharp crystallinity. The x-ray diffraction showed no diffraction peaks corresponding to (001) and (110) superlattice reflections from an fct structure, only peaks from fcc structures. The x-ray crystallite size ($D_X$) was 7.0 nm. Based on this, the single crystallinity was 0.81.

The TEM-EDS measurements showed that the average composition in terms of atomic ratio was Fe:Pt=51:49. That is, $X_{av}$ was 51.0 at %. Also, based on an analysis of the composition of 100 randomly-selected particles, with a standard deviation σ of 10%, 98 particles satisfied equation (1), and only two particles did not. Measurements of magnetic properties showed a coercive force of 332 Oe, a magnetic saturation amount σs of 0.03 emu/g, and an SQ of 0.01; SFD was unmeasurable.

COMPARATIVE EXAMPLE 1

The procedure used for Example 1 was repeated, except that a complexing agent (succinic acid) was not used.

Figure 4:
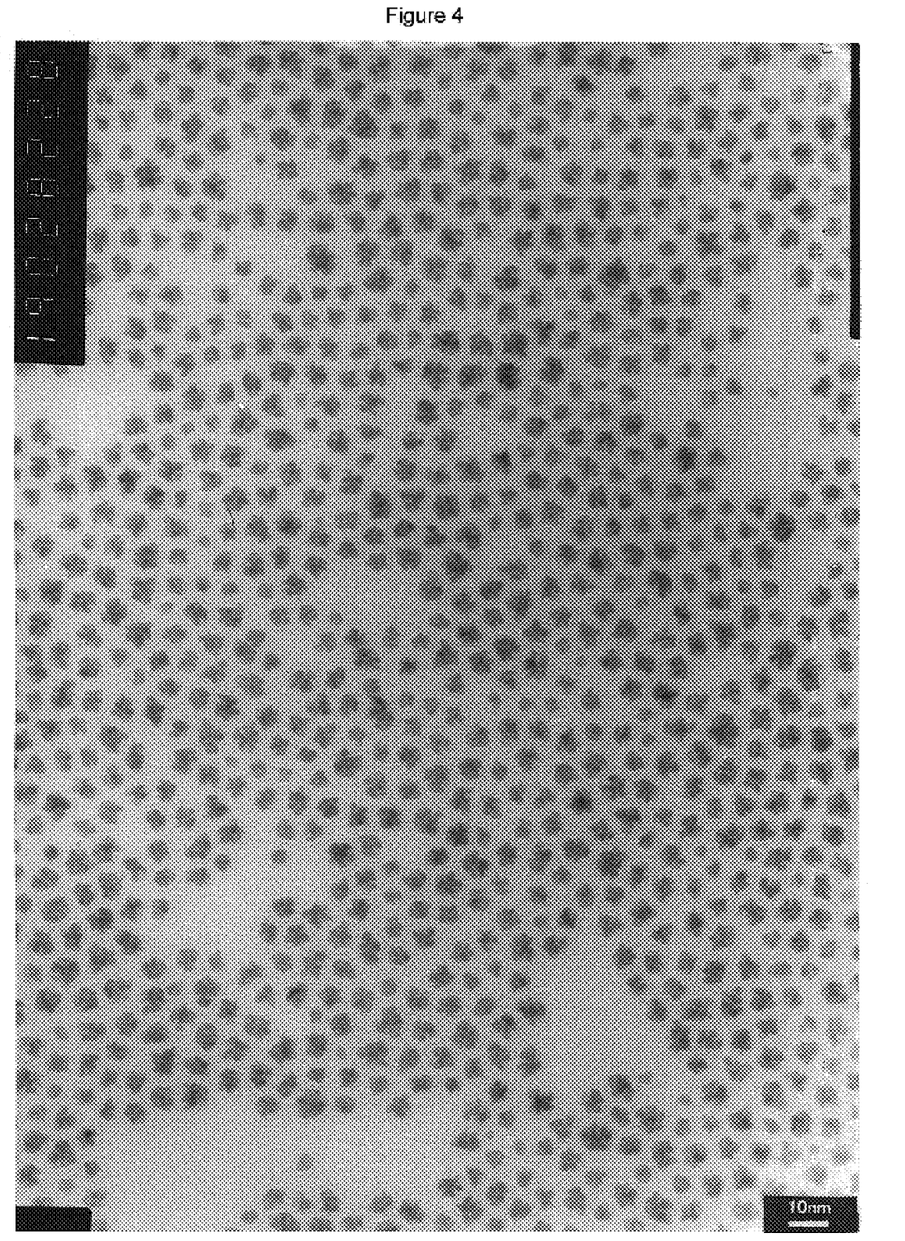
FIG. 4 is a TEM photomicrograph of the FePt alloy of a comparative example.

The result of the TEM-based measurement with respect to the FePt particles thus obtained is shown in FIG. 4. The average grain size of the primary particles was 6.0 nm, and, as can be seen from FIG. 4, the particles were observed to have uneven surface contours (numerous projections and indents, like sugar candy balls as Japanese name Konpeitou). The x-ray diffraction showed no diffraction peaks corresponding to (001) and (110) superlattice reflections from an fct structure, only peaks from fcc structures. The x-ray crystallite size ($D_X$) was 2.2 nm. Based on this, the single crystallinity was 2.72.

The TEM-EDS measurements showed that the average composition in terms of atomic ratio was Fe:Pt=52:48. That is, $X_{av}$ was 52.0 at %. Also, based on an analysis of the composition of 100 randomly-selected particles, with a standard deviation σ of 21%, 6 particles did not satisfy equation (1). Measurements of magnetic properties showed a coercive force of 2 Oe, a magnetic saturation amount σs of 7.71 emu/g, and an SQ of 0.04; SFD was unmeasurable.

EXAMPLE 3

The reaction was terminated using the same arrangement and conditions as in Example 1. Specifically, reflux for 1 hour at 200° C. was implemented, and the procedure of Example 1 repeated until the reaction ended. Then, the temperature was elevated (at an average temperature elevation rate of 10° C./min from 200° C. to 250° C.) to 300° C., at which temperature reflux was carried out for 5 hours.

After the termination of this process, an amount of ethanol was added that was equivalent to three times the amount of the solution, and the solution was centrifuged, the supernatant liquid was removed, and 100 mL of methanol was added to the residue (the particles), which was then placed in an ultrasonic cleaning tank, where the particles were dispersed. The dispersion solution was then centrifuged and the supernatant removed. Methanol was again added to the residue (particles) which was again dispersed in an ultrasonic cleaning tank and centrifuged for cleaning purposes, and this procedure was repeated a further two times. After the supernatant had been removed for the last time, the FePt nanoparticles thus obtained was provided to measure in the x-ray diffraction (XRD), and to analyze the composition and magnetic properties by VSM.

The x-ray diffraction showed diffraction peaks corresponding to (001) and (110) superlattice reflections from an fct structure, confirming the presence of face-centered tetragonal structures. Based on Moessbauer spectrometry measurements of Fe atoms, the proportion of fct structure was found to be 75%. Measurements of magnetic properties showed a coercive force of 3610 Oe, a magnetic saturation amount σs of 42.4 emu/g, an SQ of 0.575, and an SFD of 0.879.

EXAMPLE 4

The reaction was terminated using the same arrangement and conditions as in Example 2. Specifically, reflux for 1 hour at 200° C. was implemented, and the procedure of Example 2 repeated until the reaction ended. Then, the temperature was elevated (at an average temperature elevation rate of 10° C./min from 200° C. to 250° C.) to 300° C., at which temperature reflux was carried out for 5 hours.

After this, the same washing and separation procedure as that of Example 3 was performed, and the FePt particles thus obtained were subjected to x-ray diffraction, which showed diffraction peaks corresponding to (001) and (110) superlattice reflections from an fct structure, confirming the presence of face-centered tetragonal structures. Based on Moessbauer spectrometry measurements of Fe atoms, the proportion of fct structure was found to be 74%. Measurements of magnetic properties showed a coercive force of 3250 Oe, a magnetic saturation amount σs of 37.5 emu/g, an SQ of 0.568, and an SFD of 0.862.

COMPARATIVE EXAMPLE 2

The reaction was terminated using the same arrangement and conditions as in Comparative Example 1. Specifically, reflux for 1 hour at 200° C. was implemented, and the procedure of Comparative Example 1 repeated until the reaction ended. Then, the temperature was elevated (at an average temperature elevation rate of 10° C./min from 200° C. to 250° C.) to 300° C., at which temperature reflux was carried out for 5 hours.

After this, the same washing and separation procedure as that of Example 3 was performed, and the FePt particles thus obtained were subjected to x-ray diffraction, which showed diffraction peaks corresponding to (001) and (110) superlattice reflections from an fct structure, confirming the presence of face-centered tetragonal structures. Based on Moessbauer spectrometry measurements of Fe atoms, the proportion of fct structure was found to be 41%. Measurements of magnetic properties showed a coercive force of 985 Oe, a magnetic saturation amount σs of 21.3 emu/g, an SQ of 0.42, and an SFD of 0.92.

A comparison between Comparative Example 2 and Examples 3 and 4 clearly shows that in the case of FePt particles having an fcc structure fabricated by adding a complexing agent (the particles of Examples 1 and 2) and which are then heat treated to effect phase transformation to an fct structure, the proportion of the fct structure is higher than that of FePt particles having an fcc structure obtained without the addition of a complexing agent (the particles of Comparative Example 1), even when the phase transformation to the fct structure is effected using the same heat treatment, in addition to which better magnetic characteristics are also obtained.

FIG. 5

Figure 5:
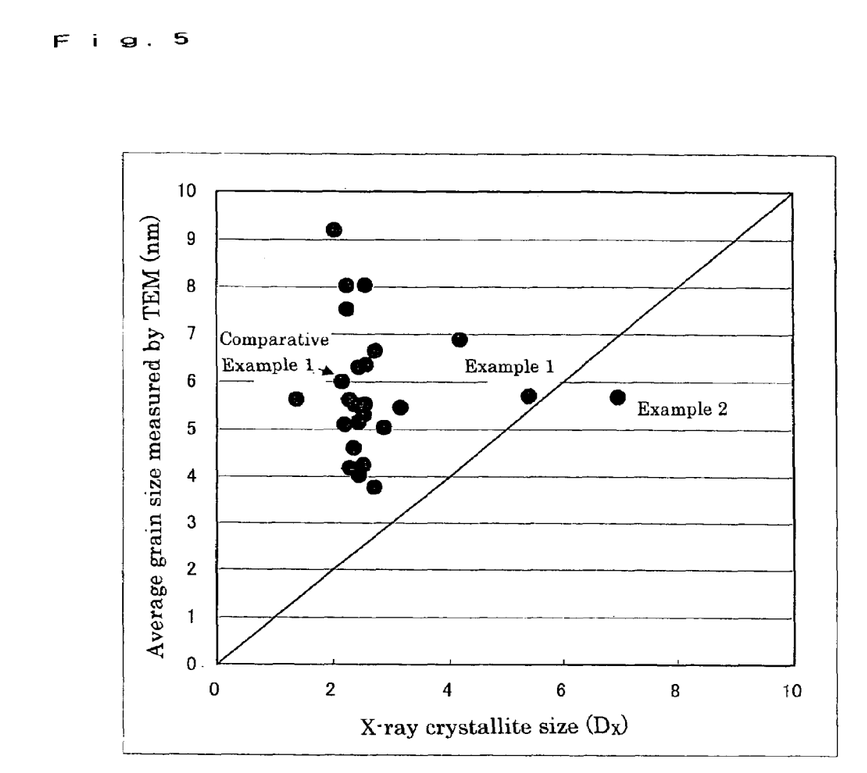
FIG. 5 is a graph showing the relationship between TEM-measured average grain size ($D_{TEM}$) and the x-ray crystallite size ($D_X$) in respect of FePt alloy particles manufactured under various conditions.

FIG. 5 is a graph showing the relationship between TEM-measured average grain size ($D_{TEM}$) and the x-ray crystallite size ($D_x$), not only in respect of the FePt alloy particles of Examples 1 and 2 and Comparative Example 1, but also in respect of the FePt particles of many other examples. In each case, the materials and reaction temperature of 200° C. are the same as those of Examples 1 and 2 and Comparative Example 1. However, other conditions were different, in particular, the temperature elevation rate, and said FePt particles were obtained without the addition of a complexing agent. The results of FIG. 5 show that, even without adding a complexing agent, the average grain size (DTEM), as measured by TEM, can be changed by adjusting the reaction conditions. However, there is substantially no change in the x-ray crystallite size ($D_x$), showing that it is difficult to improve the single crystallinity without adding a complexing agent. In contrast, in the case of Examples 1 and 2 in which a complexing agent was added, the single crystallinity is close to a straight line, at 1, showing that there is a major improvement in the single crystallinity.

What is claimed is:

1. Alloy particles of an alloy having a face-centered cubic structure, comprising:

T and M in such a composition ratio that, when T is one or two selected from Fe and Co, and M is one or two selected from Pt and Pd, X in formula $T_xM_{1-x}$ is within the range of 0.3 to 0.7, and, with respect to (T+M), no more than 30 atomic percent (including zero percent) of metallic elements other than T and M, with the remainder being unavoidable impurities, the alloy particles having a TEM-measured average grain size ($D_{TEM}$) of not more than 50 nm, and a single crystallinity ($D_{TEM}$)/($D_x$) that is less than 1.50, where ($D_x$) is X-ray crystallite size, in which 90 or more out of 100 particles satisfy the equation (1) below and equation (2) below is satisfied, $$0.90X_{av} \leq X_1, X_2, \ldots X_{100} \leq 1.10X_{av} \quad (1)$$

Standard deviation σ of $X_1, X_2, \ldots X_{100} \leq 20\%$ (2)

provided that with respect to the value of X in the formula $T_xM_{1-x}$, $X_{av}$ represents a measured particle value (value of X in the mean constituent of a particle assemblage), and of $X_1, X_2, \ldots X_{100}$ represents the measured X value of each of 100 particles arbitrarily selected when the measurement field of view contains 1000 or more particles.

2. The alloy particles according to claim 1, wherein primary particles comprise up to five crystal grains.

3. The alloy particles according to claim 1, wherein the particles are spaced apart in a distributed state.

4. The alloy particles according to claim 1, wherein junction between particles is suppressed by mutual reaction.

5. The alloy particles according to claim 1, wherein a surface active agent is adhered to the surface of each particle.

6. The alloy particles according to claim 1, wherein a coupling agent or modified coupling agent is adhered to the surface of each particle.

7. The alloy particles according to claim 1, wherein TEM-based observation shows almost no surface pitting of particles.

8. The alloy particles according to claim 1, wherein heat treatment is used to effect phase change from a face-centered cubic structure to a face-centered tetragonal structure.

9. The alloy particles according to claim 1, wherein the metallic elements other than T and M are at least one selected from the group Au, Ru, Rh, Os and Ir.

10. The alloy particles according to claim 1, wherein the metallic elements other than T and M are at least one selected from the group Au, Ag, Cu, Sb, Bi and Pb.

* * * * *